No. 649,093. Patented May 8, 1900.
G. WOOD.
LAYING APPARATUS FOR CROPS.
(Application filed Jan. 27, 1900.)
(No Model.)
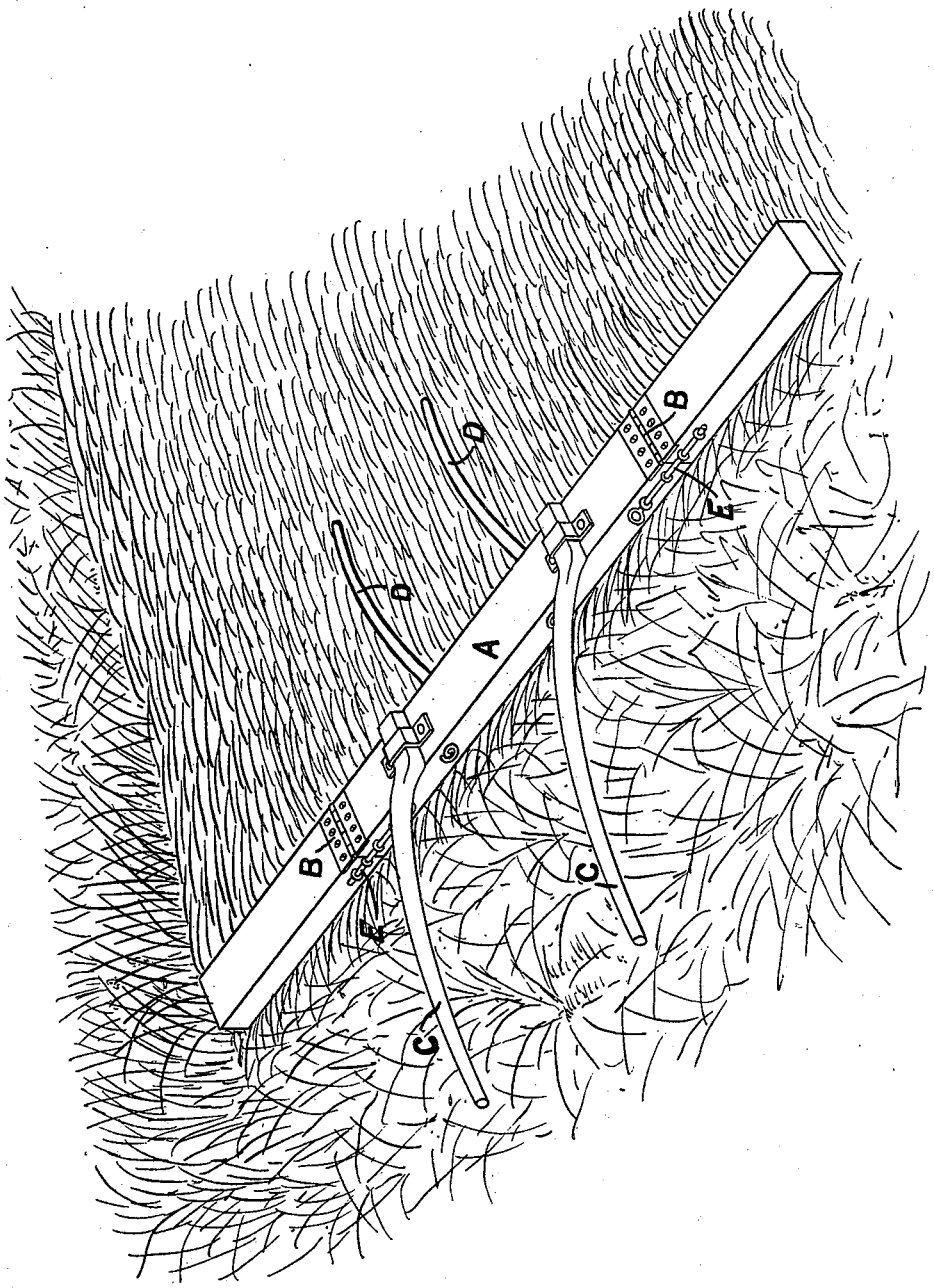
Witnesses
Inventor

UNITED STATES PATENT OFFICE.

GEORGE WOOD, OF TRAM INN, ENGLAND.

LAYING APPARATUS FOR CROPS.

SPECIFICATION forming part of Letters Patent No. 649,093, dated May 8, 1900.

Application filed January 27, 1900. Serial No. 3,034. (No model.)

*To all whom it may concern:*

Be it known that I, GEORGE WOOD, a subject of the Queen of Great Britain, residing in Tram Inn, in the county of Hereford, England, have invented certain new and useful Improvements in Laying Apparatus for Crops, of which the following is a specification.

Hitherto farmers have found it difficult to cut heavy crops of clover or hay satisfactorily by machinery or manual labor which has been laid or battered down by wind or storm. A heavy crop of clover is always laid more or less, no matter what the weather may be, and the cost of cutting heavy crops of hay or clover is greatly increased when they are so laid by storm, besides they cannot be cut so close, thus causing waste. By the present invention, however, I can cut the crops with the greatest ease and at little expense. To effect this result, I make the crop grow in such a manner that the machine will easily cut it, no matter whether there are storms or not. To this end I provide an implement (shown in the accompanying drawing) comprising a flat batten A—say about sixteen feet by seven inches by three inches—or a plank or the like. It is provided with hinges B, so that the ends will fold to enable it to go through a gateway.

C represents light shafts.

D represents handles for lifting the implement when required, and the shafts take a bearing at the time it is being lifted.

E represents sliding bolts to keep the hinged ends of the implement down in place when at work.

The implement is dragged over the field the contrary way in which the mowing-machine travels, and it must be done before the crop is laid by wind, storm, or otherwise. The result of the operation is to evenly lay the crop all over the field in the opposite direction to that in which the mowing-machine travels, so that it will be in the best possible position to be cut by the machine. Thus instead of the hay or clover growing upright or being laid in the wrong direction by storms it will be laid all in one direction to meet the mowing-machine sickle, and after the crop is thus laid in the direction required it goes on growing as fast as before; but wind or storm will not alter the direction in which it is laid, but rather tend to maintain it in the direction required.

The apparatus may be drawn along by man-power or it may be pulled over the field by a horse or pony, in which case a greater width can be done at a time.

The best way to cut clover or hay crops by a mowing-machine is to commence around the outside and finish in the middle. The laying implement should always turn the corners in a circular direction, and the mowing-machine will cut the crop by turning the corners either in a circular direction or turning at right angles. A man and a small pony can easily do upward of twenty acres in a day. By the present invention therefore I am able to cut the entire crop short at the ground, and the great defect that a large quantity of the crop is wasted by the machinery not being able to cut it closely will be entirely obviated.

I declare that what I claim is—

An implement of the character described comprising a plank adapted to be dragged broadside over a field, shafts in which to harness an animal, and handles projecting rearwardly therefrom, the parts being arranged and combined, substantially as described.

In witness whereof I have hereunto signed my name, this 15th day of January, 1900, in the presence of two subscribing witnesses.

GEORGE WOOD.

Witnesses:
 JOSEPH THOMAS,
 OWEN LEVI BRADLEY.